(12) United States Patent
Bruner et al.

(10) Patent No.: US 11,443,486 B2
(45) Date of Patent: Sep. 13, 2022

(54) MOBILE 3D BODY SCANNING METHODS AND APPARATUS

(71) Applicant: SIZE STREAM LLC, Cary, NC (US)

(72) Inventors: David Allen Bruner, Cary, NC (US); Stephen Philip Christie, Raleigh, NC (US); Jerry Michael King, Raleigh, NC (US); Ryan Matthew Matis, Pittsboro, NC (US); Mark Elliott Neumann, Pittsboro, NC (US); Susan Leigh Simon, Cary, NC (US); Bryan William Taylor, Raleigh, NC (US); Warren Peter Wright, Apex, NC (US)

(73) Assignee: SIZE STREAM LLC, Cary, NC (US)

( * ) Notice: Subject to any disclaimer, the term of this patent is extended or adjusted under 35 U.S.C. 154(b) by 0 days.

(21) Appl. No.: 17/273,251

(22) PCT Filed: Aug. 28, 2019

(86) PCT No.: PCT/US2019/048539
§ 371 (c)(1),
(2) Date: Mar. 3, 2021

(87) PCT Pub. No.: WO2020/072148
PCT Pub. Date: Apr. 9, 2020

(65) Prior Publication Data
US 2021/0335040 A1    Oct. 28, 2021

Related U.S. Application Data

(60) Provisional application No. 62/740,219, filed on Oct. 2, 2018.

(51) Int. Cl.
*G06T 17/20* (2006.01)
*A41H 1/02* (2006.01)
(Continued)

(52) U.S. Cl.
CPC ............... *G06T 17/20* (2013.01); *A41H 1/02* (2013.01); *G01B 11/24* (2013.01);
(Continued)

(58) Field of Classification Search
CPC ............... G06T 17/20; G06T 2200/21; G06T 2207/10028; A41H 1/02; G01B 11/24
See application file for complete search history.

(56) References Cited

U.S. PATENT DOCUMENTS 5,530,652 A * 6/1996 Croyle ............... G06T 7/593
356/612
6,415,199 B1   7/2002 Liebermann
(Continued)

OTHER PUBLICATIONS

"International Search Repod and Written Opinion of the International Searching Authority", International Application No. PCT/US2019/048539, dated Nov. 20, 2019, 8 pp.
(Continued)

*Primary Examiner* — Terrell M Robinson
(74) *Attorney, Agent, or Firm* — Myers Bigel, P.A.

(57) ABSTRACT

An arrangement for obtaining body measurements of a person includes a garment configured to be form fitted to the person, a reference target, and a handheld digital camera. A surface of the garment includes a plurality of first fiducials which are photogrammetrically analyzable. The reference target includes a plurality of second fiducials that are photogrammetrically analyzable. The plurality of second fiducials on the reference target facilitate producing a 3D model true to scale and in a recognized orientation to a surface on which the person is standing. The handheld digital camera acquires a plurality of successive images of the garment and reference target as the digital camera is moved around the person. A computer processes the plurality images by methods of photogrammetry to produce a 3D model of the body.
(Continued)

A portable stabilization device may be held by the person to reduce movement and control arm spacing during image acquisition.

22 Claims, 19 Drawing Sheets

(51) Int. Cl.
  *G01B 11/24* (2006.01)
  *G06Q 30/06* (2012.01)
(52) U.S. Cl.
  CPC ...... *G06Q 30/0643* (2013.01); *G06T 2200/21* (2013.01); *G06T 2207/10028* (2013.01)

(56) References Cited

U.S. PATENT DOCUMENTS

| | | | | |
|---|---|---|---|---|
| 2006/0077278 | A1* | 4/2006 | Parulski | H04N 1/0044 348/333.01 |
| 2009/0196528 | A1* | 8/2009 | Fitzpatrick | G06T 15/503 709/204 |
| 2010/0319100 | A1 | 12/2010 | Chen et al. | |
| 2014/0307101 | A1* | 10/2014 | Cobb | H04N 21/41407 348/169 |
| 2015/0097980 | A1* | 4/2015 | Cucci | H04N 5/23206 348/211.2 |
| 2016/0381271 | A1 | 12/2016 | Cheng et al. | |
| 2020/0154061 | A1* | 5/2020 | Jones | H04N 5/23293 |

OTHER PUBLICATIONS

Musicman559, "Today's #shityrig brought to you by my grandma's walker", Reddit [online 25-27 bulletin]. Published on Aug. 16, 2016 [retrieved on Nov. 4, 2019], Retrieved from the Internet: <URL:https://www.reddit.com/r/Filmmakers/comments/4y3v1y/todays_shityrig_brought_to_you_by_my grandmas>, 1 pp.

* cited by examiner

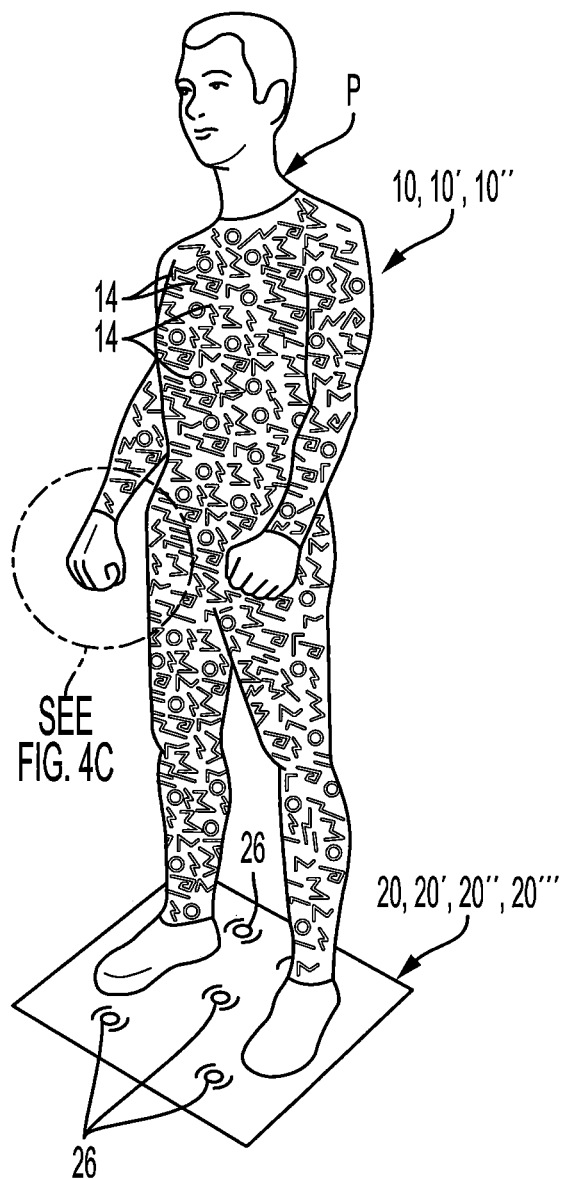
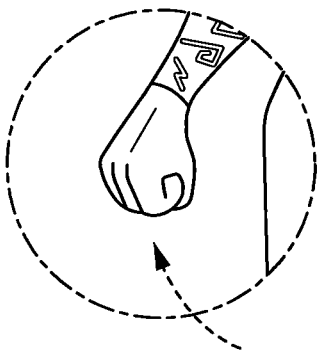
FIG. 4C
FIG. 4B

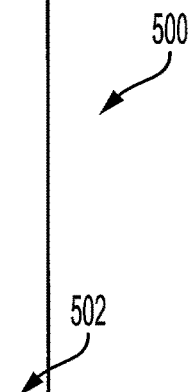

```
Collar Circumference: 13.71
Neck Circumference: 15.63
Back Shoulder Width Horizontal: 16.24
Shoulder Length Left: 4.30
Shoulder Length Right: 4.61
Shoulder Slope Left: 28.06
Shoulder Slope Right: 26.62
??? Circumference: 44.05
Chest / Bust Circumference: 36.76
???: 35.52
Underbust Circumference: 11.70
??? To ??? Length: 4.14
Side Neck To Bust Length Left: 9.92
Side Neck To Bust Length Right: 9.43
Arm ??? Circumference Left: 19.54
Arm ??? Circumference Right: 19.74
Arm Length Left: 21.37
Arm Length Right: 22.81
Arm Under Length Left: 17.67
Arm Under Length Right: 17.75
Sleeve Length Left: 29.80
Sleeve Length Right: 30.24
Waist Circumference: 31.76
Waist Height: 39.56
Horizontal Waist: 31.62
??? Waist: 34.56
Narrow Waist: 31.22
??? ??? ???: Unavailable
Elbow Height ???: 11.56
Stomach ??? Circumference: 31.88
Stomach ??? Circumference: 31.38
Abdomen Circumference: 35.14
Abdomen Height: 38.06
Abdomen Rise: 7.33
Hip Circumference: 40.00
Seat Circumference: 38.07
Crotch Height: 35.71
Crotch Length Full: 23.20
Front Vertical Rise: 7.37
Fold Height: 31.60
Inseam Left: 31.00
Inseam Right: 30.10
Outside Leg Length Left: 30.90
Outside Leg Length Right: 30.24
Thigh Circumference Left: 23.68
Thigh Circumference Right: 24.11
MidThigh Circumference Left: 20.06
MidThigh Circumference Right: 19.90
Knee Circumference Left: 14.73
Knee Circumference Right: 14.43
UnderKnee Circumference Left: 13.53
UnderKnee Circumference Right: 13.50
UnderKnee Height Left: 15.83
UnderKnee Height Right: 16.07
Calf Circumference Left: 15.06
Calf Circumference Right: 15.01
Max Lower Leg Girth Left: 9.55
Max Lower Leg Girth Right: 9.10
Foot Length Left: 9.05
Foot Length Right: 9.65
Surface Area Total: 1754.63
Surface Area Leg Left: 637.71
Surface Area Leg Right: 702.87
Surface Area Arm Left: 255.81
Surface Area Arm Right: 256.28
Surface Area ???: 801.95
Volume: 4340.03
Leg Volume Left: 622.31
Leg Volume Right: 624.80
Torso Volume: 3792.14
Arm Volume Left: 206.76
```

FIG. 7C

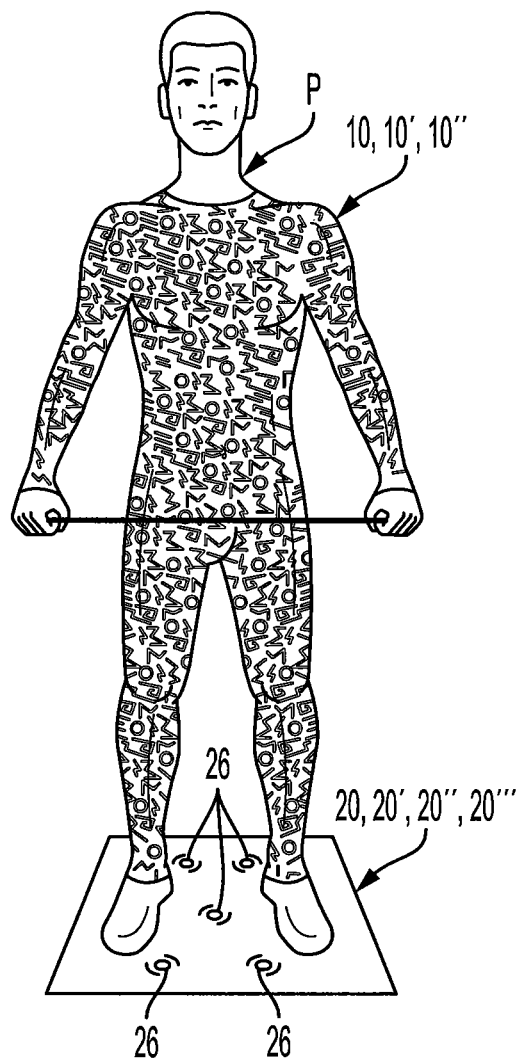
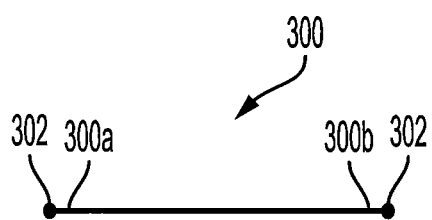
FIG. 8A
FIG. 8B

MOBILE 3D BODY SCANNING METHODS AND APPARATUS

RELATED APPLICATIONS

This application is a 35 U.S.C. § 371 national stage application of PCT Application No. PCT/US2019/048539, filed on Aug. 28, 2019, which claims the benefit of and priority to U.S. Provisional Patent Application No. 62/740,219 filed Oct. 2, 2018, the disclosures of which are incorporated herein by reference as if set forth in their entireties. The above-referenced PCT International Application was published in the English language as International Publication No. WO 2020/072148 A1 on Apr. 9, 2020.

FIELD OF THE INVENTION

The present invention relates generally to obtaining 3D body models and body measurements and, more particularly, to apparatus and methods for obtaining 3D body models and body measurements.

BACKGROUND OF THE INVENTION

A goal of the apparel industry has been to provide custom-fit or made-to-measure clothing through the use of body measurement technologies such as two dimensional video silhouette imaging, laser-based scanning, and white light phase measurement. Such prior techniques have proved adequate to make sufficient measurements of a human body only when resorting to costly and complex hardware and software arrangements. Traditionally, tailors and fitters have taken body measurements themselves for the same purposes. However, a tailor's measurements can be very inconsistent when compared with other tailors. An accurate reliable data set of the surface of the body of a person is needed in order to develop consistent body measurements. Moreover, with the advent of the Internet and on-line shopping, a significant need has arisen in the apparel industry to acquire 3D body models and accurate measurements directly from customers in order to find the proper ready-to-wear item or to either alter or make a garment to order. Additionally, there is value in 3D body models and body measurements in numerous other industries, such as, but not limited to, medical, health and fitness applications.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the invention.

According to some embodiments of the present invention, a method of obtaining body measurements of a person includes enclosing a portion of a body of the person in a form fitting garment, wherein a surface of the form fitting garment is marked with a plurality of first fiducials that are photogrammetrically analyzable. The portion of the body may include any portion or all of the body of a person. For example, the garment may be configured to enclose one or more limbs of the body and/or the torso of the body. In some embodiments, an additional portion of the body of the person may be enclosed with a second form fitting garment, wherein a surface of the second garment includes a plurality of the first fiducials. In some embodiments, an additional portion of the body of the person may be enclosed with an accessory, wherein a surface of the accessory includes a plurality of the first fiducials. Such an accessory may include a hat, a head band, at least one glove, or at least one sock, etc.

The person then stands on or near, or even holds, a reference target that includes a plurality of second fiducials. The plurality of second fiducials may be identical in configuration and/or color to the plurality of first fiducials in some embodiments. In other embodiments, the plurality of second fiducials may be different in configuration and/or color from the plurality of first fiducials. The plurality of second fiducials are also photogrammetrically analyzable and are of known proportion to facilitate producing the 3D model true to scale and in a recognized origin and orientation to a surface on which the reference target is positioned. A digital camera, such as the camera of a smartphone or other portable image capture device, is then moved around the person and a plurality of images of the garment and reference target are acquired at successive positions of the digital camera as it is moved around the person. The plurality images are then processed by one or more photogrammetry methods to produce a 3D model of the portion of the body, and from which body measurements can be obtained.

In some embodiments, the surface of the garment has a first color and the plurality of first fiducials have a second color different from the first color. The method may also include removing background from the plurality of images prior to the processing step and this may be accomplished by removing portions of the images not having the first and second colors. In other embodiments, other background removal and object detection techniques which have no dependence on color may be utilized.

According to other embodiments of the present invention, an arrangement for obtaining body measurements of a person includes a garment configured to be form fitted to the person's body (or a portion of the person's body), a reference target upon which the person stands on or near, and a handheld digital camera, such as a smartphone. A surface of the form fitting garment includes a plurality of first fiducials which are photogrammetrically analyzable. In some embodiments, the surface of the garment has a first color and the plurality of first fiducials have a second color different from the first color. The reference target includes a plurality of second fiducials that are photogrammetrically analyzable. The plurality of second fiducials may be identical in configuration and/or color to the plurality of first fiducials in some embodiments. In other embodiments, the second plurality of fiducials may be different in configuration and/or color from the plurality of first fiducials. The plurality of second fiducials on the reference target are of known proportion and facilitate producing a 3D model true to scale and in a recognized position and orientation to a surface on which the person is standing. The handheld digital camera is configured to acquire a plurality of successive images of the garment and reference target as the digital camera is moved around the person. The arrangement further includes a computer to which the acquired images are transmitted and which is configured to process the plurality images by one or more methods of photogrammetry to produce a 3D model of the body, and from which body measurements can be obtained.

A portable stabilization device may be provided that is configured to be held by the person, and that is configured to help reduce movement of the person and control arm spacing during image acquisition. In some embodiments, the stabilization device is an elongate rod configured to be held by both hands of the person. In some embodiments, the stabilization device is a walker-style device that rests on the floor and that is configured to be gripped by both hands of the person.

According to other embodiments of the present invention, an arrangement for obtaining body measurements of a person includes a garment configured to be form fitted to the person's body (or a portion of the person's body), and a reference target upon which the person stands on or near. A surface of the form fitting garment includes a plurality of first fiducials which are photogrammetrically analyzable. In some embodiments, the surface of the garment has a first color and the plurality of first fiducials have a second color different from the first color. The reference target includes a plurality of second fiducials that are photogrammetrically analyzable. The plurality of second fiducials may be identical in configuration and/or color to the plurality of first fiducials in some embodiments. In other embodiments, the second plurality of fiducials may be different in configuration and/or color from the plurality of first fiducials.

It is noted that aspects of the invention described with respect to one embodiment may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail below.

BRIEF DESCRIPTION OF THE DRAWINGS

The accompanying drawings, which form a part of the specification, illustrate various embodiments of the present invention. The drawings and description together serve to fully explain embodiments of the present invention.

FIG. 2C also illustrates a cap with fiducials, according to some embodiments of the present invention. FIG. 2C also illustrates the person wearing the form fitting garment and cap standing within an opening of a reference target, according to some embodiments of the present invention.

FIGS. 4A-4B illustrate a person wearing a form fitting garment and standing on a reference target in preparation for having a 360° video/photo sequence taken of the form fitting garment and reference target via a handheld image capture device.

FIG. 4C is an enlarged portion of the hand of the person in FIGS. 4A-4B illustrating that the hand should be slightly forward of the body of the person when the 360° video/photo sequence is taken.

FIG. 7C is an exemplary graphical user interface displaying body measurements obtained from a 3D body model acquired in accordance with embodiments of the present invention, such as the 3D models of FIGS. 7A-7B.

FIG. 8A illustrates a person wearing a form fitting garment and standing on a reference target in preparation for having a 360° video/photo sequence taken of the form fitting garment and reference target via a handheld image capture device, and wherein the person is holding a rod that facilitates stabilization of the person and provides pose control for arm spacing.

FIG. 8B is a schematic illustration of the rod being held in FIG. 8A.

DETAILED DESCRIPTION

Figure 1:
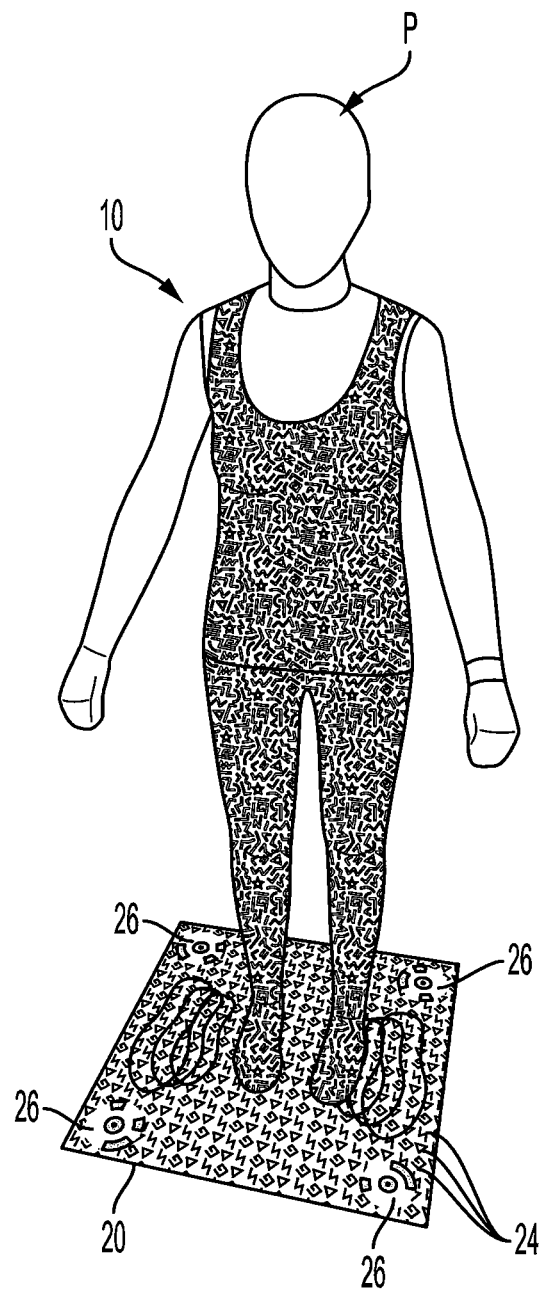
FIG. 1 is front view of a mannequin, representing a person, wearing a form fitting garment and standing on a reference target in accordance with some embodiments of the present invention.

The present invention will now be described more fully hereinafter with reference to the accompanying figures, in which embodiments of the invention are shown. This invention may, however, be embodied in many different forms and should not be construed as limited to the embodiments set forth herein. Like numbers refer to like elements throughout. In the figures, certain layers, components or features may be exaggerated for clarity, and broken lines illustrate optional features or operations unless specified otherwise. In addition, the sequence of operations (or steps) is not limited to the order presented in the figures and/or claims unless specifically indicated otherwise. Features described with respect to one figure or embodiment can be associated with another embodiment or figure although not specifically described or shown as such.

It will be understood that when a feature or element is referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached", "coupled", or "secured" to another feature or element, it can be directly connected, attached, coupled, or secured to the other feature or element or intervening features or elements may be present. In contrast, when a feature or element is referred to as being "directly connected", "directly attached", "directly coupled", or "directly secured" to another feature or element, there are no intervening features or elements present. Although described or shown with respect to one embodiment, the features and elements so described or shown can apply to other embodiments.

The terminology used herein is for the purpose of describing particular embodiments only and is not intended to be limiting of the invention. As used herein, the singular forms "a", "an" and "the" are intended to include the plural forms as well, unless the context clearly indicates otherwise.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

As used herein, the term "and/or" includes any and all combinations of one or more of the associated listed items and may be abbreviated as "/".

As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

It will be understood that although the terms first and second are used herein to describe various features or elements, these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

The term "about", as used herein with respect to a value or number, means that the value or number can vary, for example, by as much as +/−20%.

Embodiments of the present invention improve the technology of photogrammetry. Photogrammetry is the science of making measurements from photographs, especially for recovering the exact positions of surface points of objects in photographs. In the simplest example of photogrammetry, the distance between two points that lie on a plane parallel to the photographic image plane can be determined by measuring their distance on the image, if the scale of the image is known. A special case, called stereo-photogrammetry, involves estimating the three-dimensional coordinates of points on an object employing measurements made in two or more photographic images taken from different positions. Common points are identified on each image. A line of sight (or ray) can be constructed from the camera location to the point on the object. It is the intersection of these rays (triangulation) that determines the three-dimensional location of the point. More sophisticated algorithms can exploit other information about the scene that is known a priori, for example symmetries, in some cases allowing reconstructions of 3-D coordinates from only one camera position.

Conventional photogrammetry methods for capturing images of a person require a booth with cameras mounted on the walls within the booth. Embodiments of the present invention allow photogrammetry to be performed anywhere by a person with a smartphone or portable camera. For example, FIG. 1 illustrates a form fitting garment 10 worn by a mannequin (representing a person P) and a floor placed reference target 20 that are used in accordance with embodiments of the present invention to obtain a 3D model (400, FIGS. 7A-7B) of a body of a person, and from which body measurements can be obtained. The garment 10 may be made of Lycra®, nylon or any other suitable stretchable fabric that tightly conforms to the shape of the portion of a body which it encloses. The illustrated garment 10 of FIG. 1 encloses the torso, legs, and feet of the user. However, embodiments of the present invention are not limited to the illustrated garment 10. Various types of garments may be provided which enclose only selected portions of the body, such as the legs or torso. For example, if a person is to be measured for trousers or slacks, a garment 10' as shown in FIG. 2B which covers only the legs may be utilized. In addition, various other apparel articles or "accessories", such as headbands, socks, gloves, hats, etc., may be utilized to obtain a 3D model of portions of a body of a person, in accordance with embodiments of the present invention.

The term "garment", as used herein, is inclusive of all types of items that can be worn, including garments such as illustrated in FIGS. 1 and 2B, as well as accessories, such as headbands, socks, gloves, caps, hats, etc.

Figure 2A:
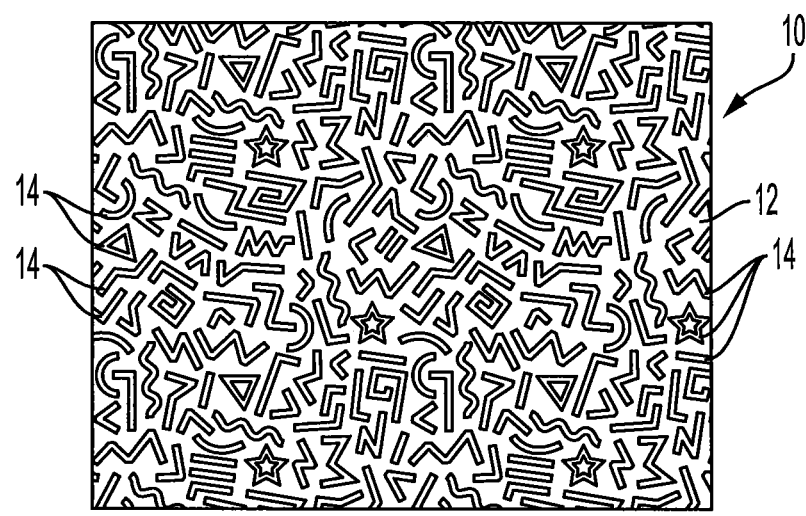
FIG. 2A illustrates the pattern and colors of the fiducials on the form fitting garment of FIG. 1.
Figure 2B:
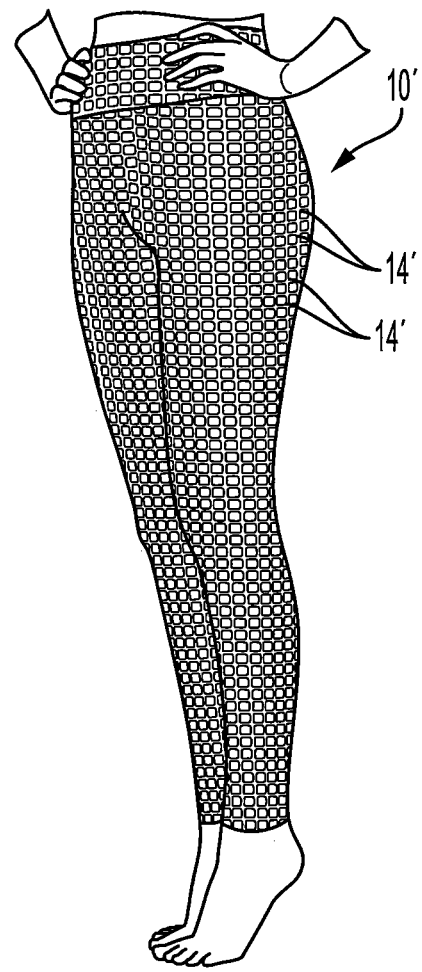
FIG. 2B illustrates a form fitting garment which is worn only on the legs, according to other embodiments of the present invention, and which has fiducials with different patterns and colors than the fiducials of the form fitting garment of FIG. 1.

The illustrated garment 10 of FIG. 1 has a solid background color 12 and a plurality of randomly arranged fiducials 14 of a different color than the background color 12, as shown in FIG. 2A. The fiducials 14 are high-contrast marks which are photogrammetrically analyzable. The term "photogrammetrically analyzable" means that images containing the fiducials 14 can be evaluated by methods of photogrammetry and digital image processing and pattern recognition, such that precise space coordinates of the photographed body, the body part or the body parts can be determined.

The garment 10 is referred to as being "feature-rich" because the randomly arranged fiducials 14 cover a majority of or the entire surface of the garment 10 so that there are few plain or blank areas, as illustrated. These randomly arranged fiducials 14 include lines, squiggles, symbols and geometric patterns. As shown in FIG. 2A, all of the fiducials 14 have the same color and are clearly distinguishable from the background color 12. The fiducials 14 may be applied to the fabric of the garment 10 in various ways, such as by printing, dyeing, weaving, stitching or otherwise affixing them to the fabric of the garment 10.

Similarly, the surface of any accessory (e.g., cap, hat, glove, head band, sock, etc.) worn by the person also includes a plurality of fiducials. These fiducials are high-contrast marks which are photogrammetrically analyzable.

Embodiments of the present invention are not limited to the illustrated fiducials 14 in FIGS. 1 and 2A. Various different fiducials having different shapes/configurations, etc., may be utilized without limitation. For example, the garment 10' illustrated in FIG. 2B includes randomly arranged polygon-shaped fiducials 14'. Moreover, embodiments of the present invention are not limited to the use of different color fiducials. Generic, non-color dependent object detection techniques may be utilized, such as "you only look once" (YOLO) real time object detection techniques.

The mannequin, which is representative of a person P, wearing the garment 10 in FIG. 1 is standing on a floor-placed reference target 20 that includes a plurality of fiducials 24 that have a different configuration than the fiducials 14 on the garment 10. The fiducials 24 are high-contrast marks which are photogrammetrically analyzable. In other embodiments, however, the plurality of fiducials 24 may have an identical or substantially identical configuration and/or color as the fiducials 14 on the garment 10.

Figure 3A:
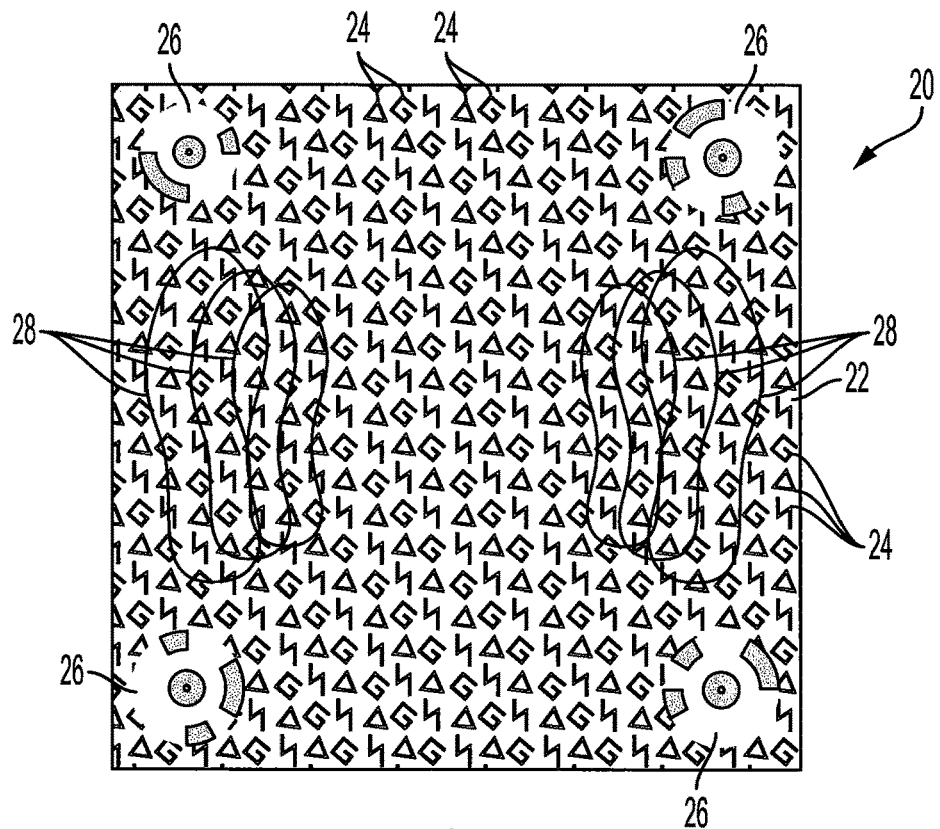
FIG. 3A is a plan view of the reference target of FIG. 1.

The illustrated reference target 20 has a generally square or rectangular configuration with a solid background color 22 and a plurality of randomly arranged fiducials 24 of different colors than the background, as shown in FIG. 3A. The fiducials 24 that make up the illustrated reference target 20 include geometric patterns, and lines. The fiducials 24 cover a majority of or the entire surface of the reference target 20 so that there are few plain or blank areas, as illustrated. In some embodiments, it may not be necessary for the person to stand on the reference target 20. Standing near or within an opening in the reference target 20 may be sufficient. Moreover, in some embodiments, the person may hold the reference target 20.

In addition, the illustrated reference target 20 includes a respective circular fiducial marker 26 located near each of the corners of the reference target 20. The illustrated fiducial markers 26 are recognizable by image processing software and serve as points of reference. The known distance between the fiducial markers 26 allows the imaging processing software to apply the correct scale to the 3D data that is obtained via photogrammetry. In addition, the position on the floor allows the imaging processing software to establish a floor ground plane with respect to the body being measured photogrammetrically. The illustrated reference target 20 also includes markings 28 to indicate where a person should place their feet on the reference target 20. These markings 28 show that the larger the feet of the person, the further their feet should be from each other when standing on the reference target 20.

Figure 3B:
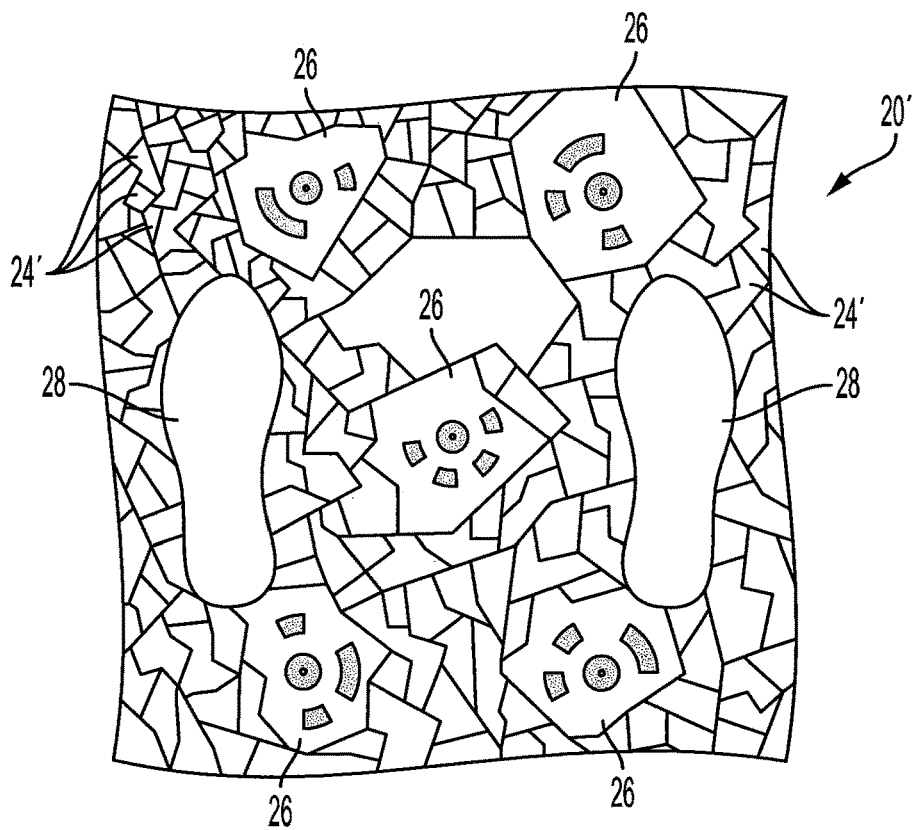
FIG. 3B is a plan view of a reference target according to other embodiments of the present invention.

FIG. 3B illustrates another floor-placed reference target 20' according to other embodiments of the present invention. The illustrated reference target 20' of FIG. 3B includes five fiducial markers 26 that are recognizable by image processing software and serve as points of reference. The remaining area of the reference target 20' is covered with a plurality of random patterns 24' which are photogrammetrically analyzable. As with the reference target 20 of FIG. 3A, the random patterns 24' of the reference target 20' in FIG. 3B cover a majority of or the entire surface of the reference target 20' between the fiducial markers 26 so that there are few plain or blank areas, as illustrated.

Figure 3C:
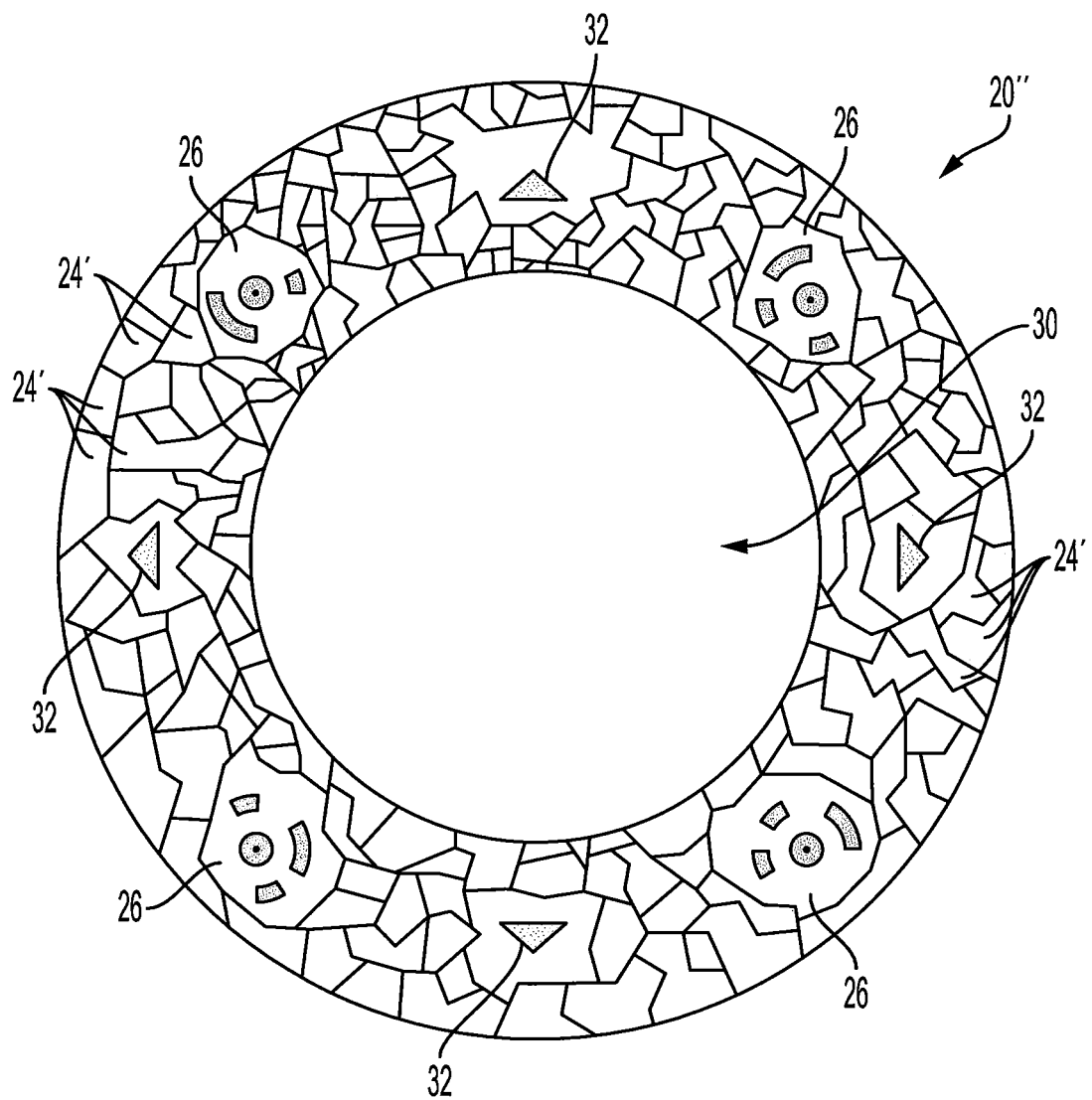
FIG. 3C is a plan view of a reference target according to other embodiments of the present invention.

FIG. 3C illustrates a floor-placed reference target 20" that has a "ring" configuration and that is cut out or open in the center, according to other embodiments of the present invention. The illustrated reference target 20" of FIG. 3C is ring-shaped with an inner open region 30 within which a person to be measured stands. Because the person is not standing on the reference target 20", but instead is standing in the cut out or opening 30, the reference target 20" cannot become wrinkled or otherwise distorted, as may be the case with other reference targets upon which a person P stands.

The illustrated reference target 20" includes four fiducial markers 26 that are recognizable by image processing software and that serve as points of reference. The remaining area of the reference target 20" is covered with a plurality of random patterns 24' which are photogrammetrically analyzable. As with the reference target 20 of FIG. 3B, the random patterns 24' of the reference target 20' in FIG. 3B cover a majority of or the entire surface of the reference target 20' between the fiducial markers 26 so that there are few plain or blank areas, as illustrated. In addition, the illustrated reference target 20" includes four directional indicators or arrows 32, pointing in directions that are offset by ninety degrees (90°) from each other. These arrows 32 direct the user to orient the reference target 20" with respect to the direction the user is facing when they stand within the reference target 20".

Figures 2C, 2D:
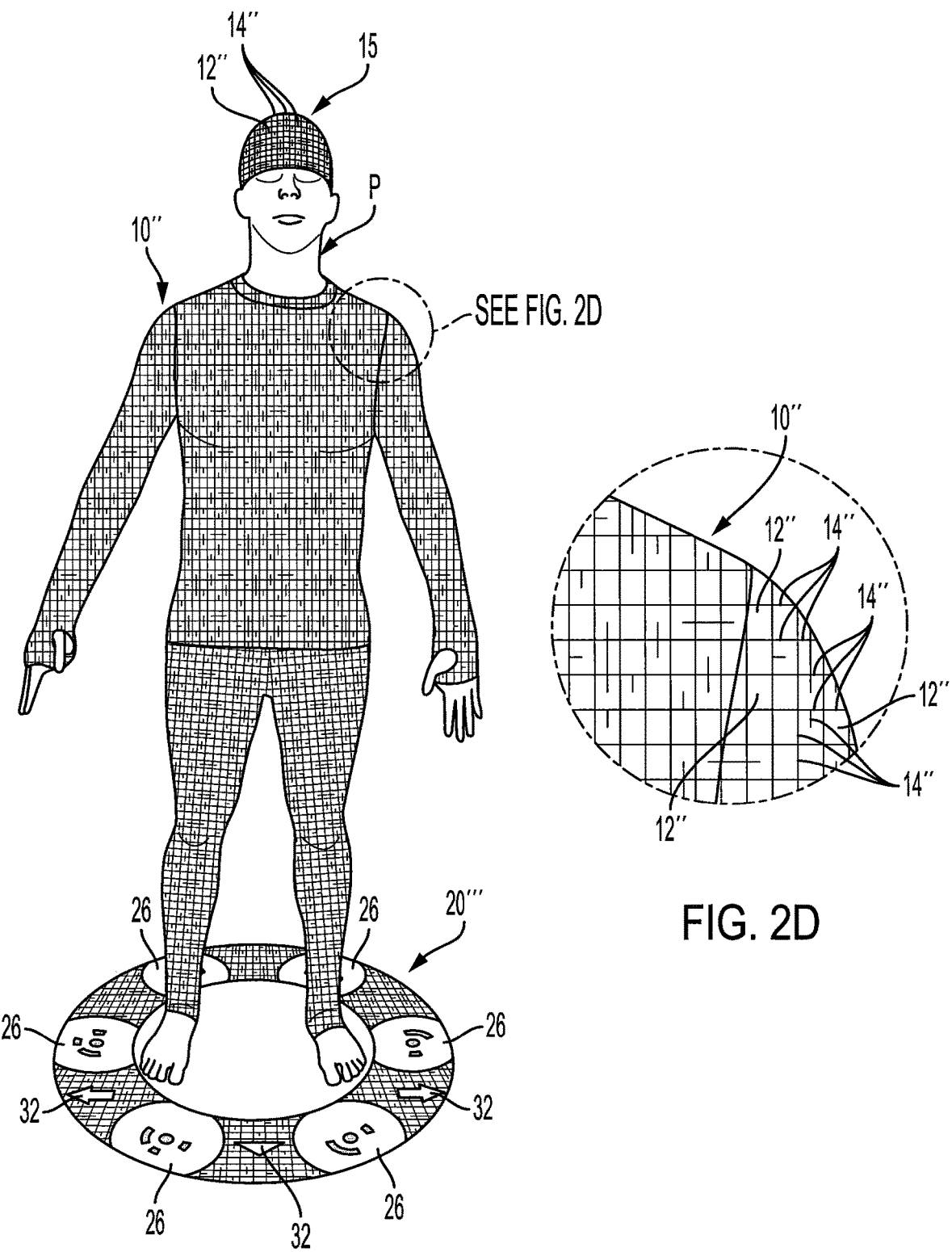
FIG. 2C illustrates a form fitting garment which covers the torso, arms, and legs of a person, according to other embodiments of the present invention, and which has fiducials with different patterns and colors than the fiducials of the form fitting garment of FIG. 1.
FIG. 2D is an enlarged portion of the garment of FIG. 2C.

FIG. 2C illustrates a form fitting garment 10" which covers the torso, arms, and legs of a person P, according to other embodiments of the present invention. The illustrated garment 10" has a solid background color 12" and random patterns of fiducials 14" of a different color than the background color 12, as shown in FIG. 2D. The fiducials 14" are high-contrast marks which are photogrammetrically analyzable. The fiducials 14" of the illustrated garment 10" of FIGS. 2C-2D are different in shape and configuration from the fiducials 14 of the garment 10 in FIG. 1. In addition, the background color 12" and the color of the fiducials 14" of the garment 10" of FIGS. 2C-2D are different from the background color 12 and the color of the fiducials 14 of the garment 10 of FIG. 1.

FIG. 2C also illustrates a cap 15 worn by the person P. The illustrated cap 15 has the same background color 12" and random patterns of fiducials 14" as the garment 10".

Figure 2E:
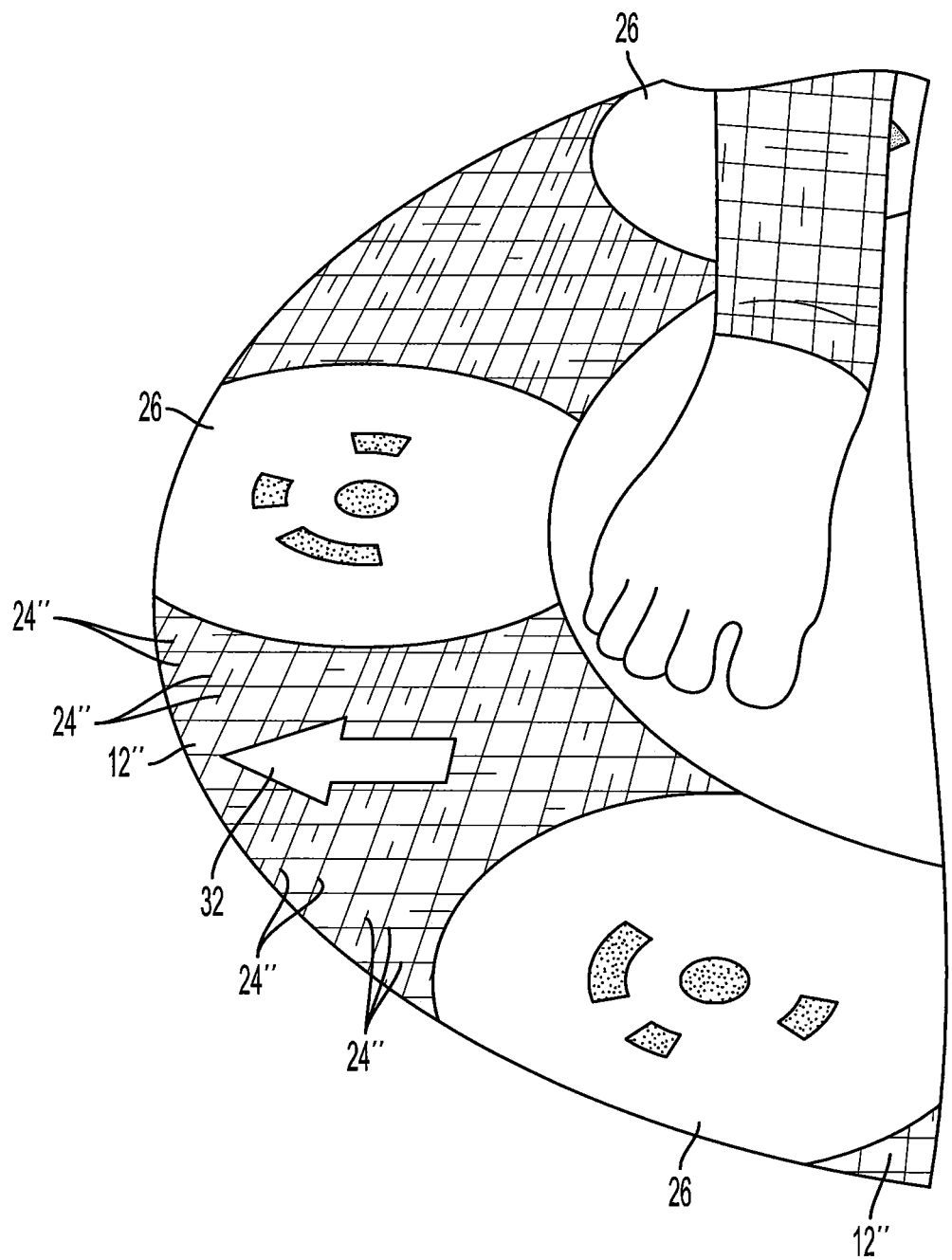
FIG. 2E is an enlarged portion of the reference target of FIG. 2C.

The person P wearing the garment 10" in FIG. 2C is standing within an opening 30 of a floor-placed reference target 20'". The illustrated reference target 20'" includes the same background color 12" and the same random patterns of fiducials 24" as the garment 10". FIG. 2E is an enlarged portion of the reference target of FIG. 2C that illustrates the fiducials 24" in greater detail. The illustrated reference target 20'" includes six fiducial markers 26 that are recognizable by image processing software and that serve as points of reference. The remaining area of the reference target 20" is covered with the photogrammetrically analyzable fiducials 24". As with the reference target 20 of FIG. 3B, the fiducials 24" of the reference target 20'" in FIG. 2C cover a majority of or the entire surface of the reference target 20'" between the fiducial markers 26 so that there are few plain or blank areas, as illustrated. In addition, the illustrated reference target 20'" includes directional indicators or arrows 32 for facilitating alignment of the person P with respect to the reference target 20".

Other reference targets that may be utilized in accordance with embodiments of the present invention may include various shapes (e.g., triangular shapes, other polygonal shapes, oval shapes, etc.) having an inner cut out region or opening within which a person stands. In addition, reference targets that may be utilized in accordance with embodiments of the present invention may be held by a person.

A novel aspect of the present invention is the combination of a garment having photogrammetrically analyzable fiducials and a reference target having photogrammetrically analyzable fiducials upon which a person wearing the garment stands, or holds, or otherwise is located adjacent thereto. These allow a photogrammetric 3D scan to be performed anywhere with a smartphone or portable camera. Traditional booths with wall mounted cameras and lighting are not required.

Figure 4A:
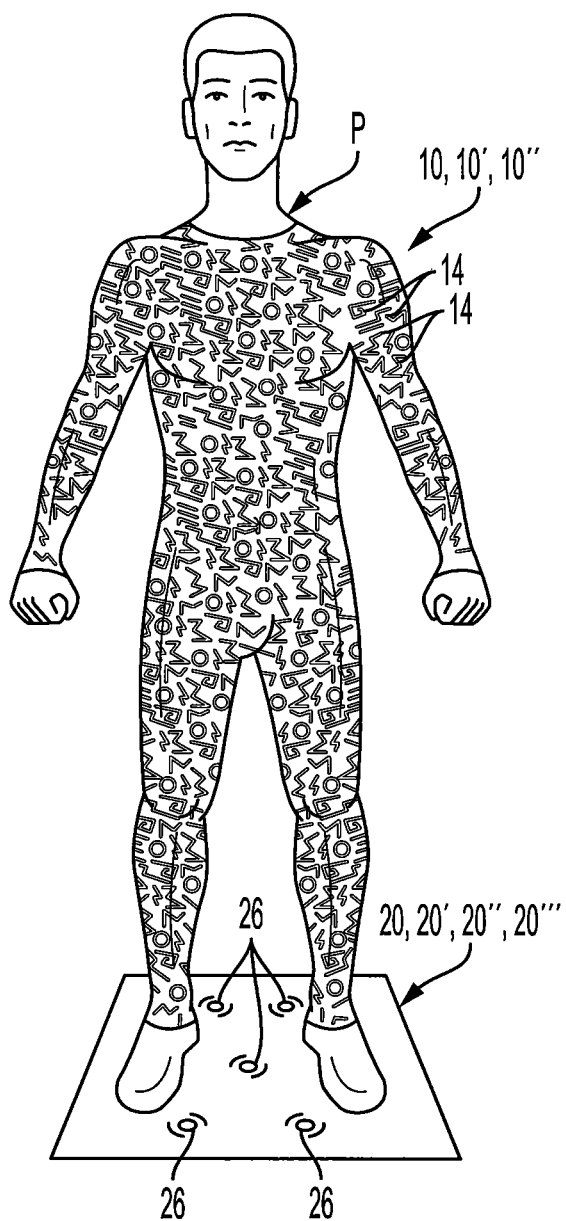

Referring now to FIGS. 4A-4C and 5A-5C, a method of obtaining body measurements using a feature-rich, form fitting garment (e.g., 10, 10', 10") worn by a person P and a reference target (e.g., 20, 20', 20", 20'"), as described above, is illustrated. In FIGS. 4A-4B, a person P wearing a form fitting garment, such as the garment 10 of FIG. 1 with photogrammetrically analyzable fiducials 14, is standing on a reference target 20 having a plurality of fiducial markers 26. Although not illustrated, the reference target 20 is also feature-rich and includes a plurality of fiducials between the fiducial markers 26 as described and illustrated with respect to FIGS. 1, 2C, 2E and 3A-3C. FIGS. 4A-4C show how a person should stand on the reference target 20 in order to be scanned. The person's feet are spaced apart and the arms are slightly forward with hands in a fist, as illustrated in FIG. 4C.

Figure 5A:
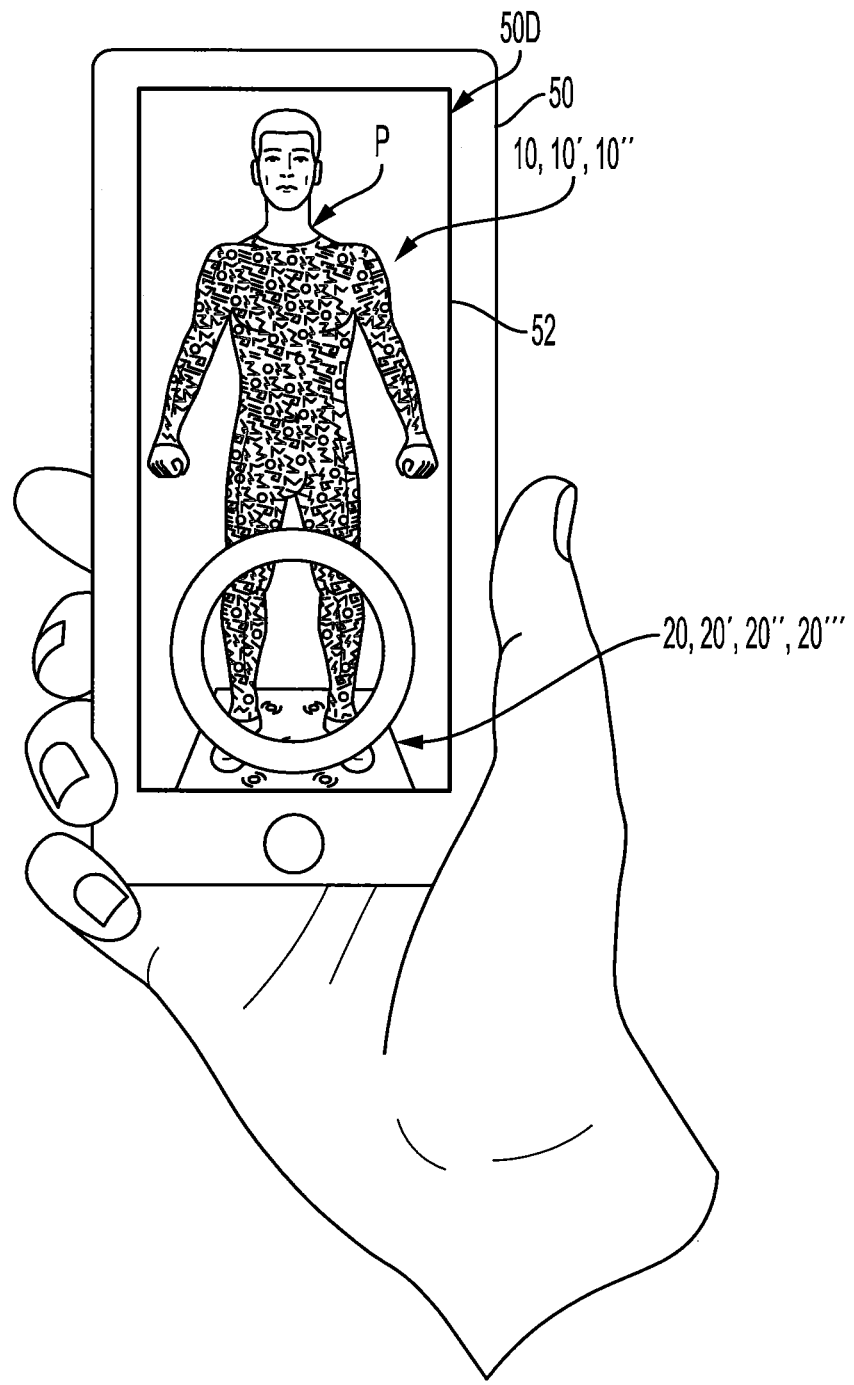
FIGS. 5A-5C illustrate operations for a person holding an image capture device to obtain a 360° video/photo sequence of the garment and reference target illustrated in FIGS. 4A-4B according to some embodiments of the present invention.
Figure 5B:
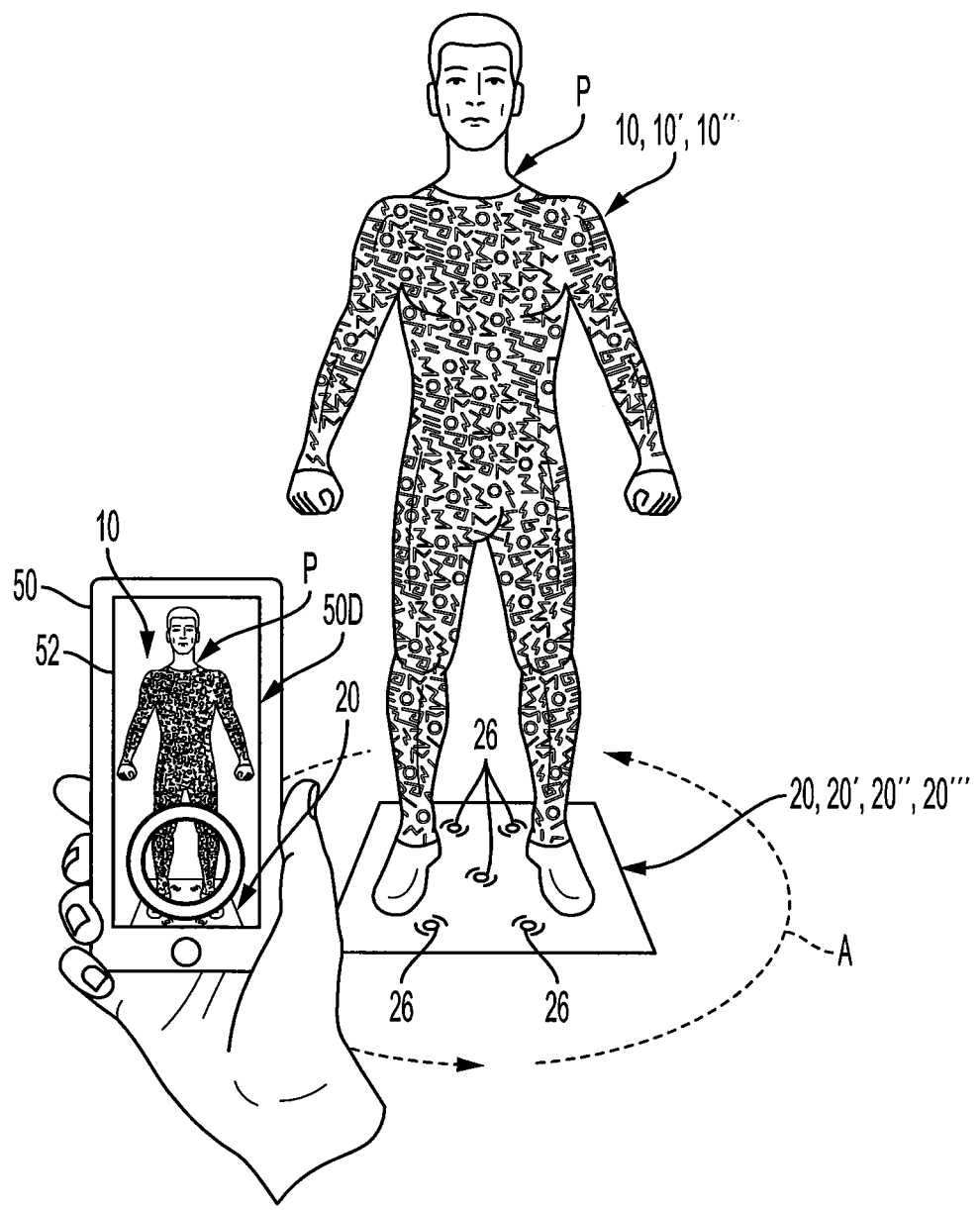
Figure 5C:
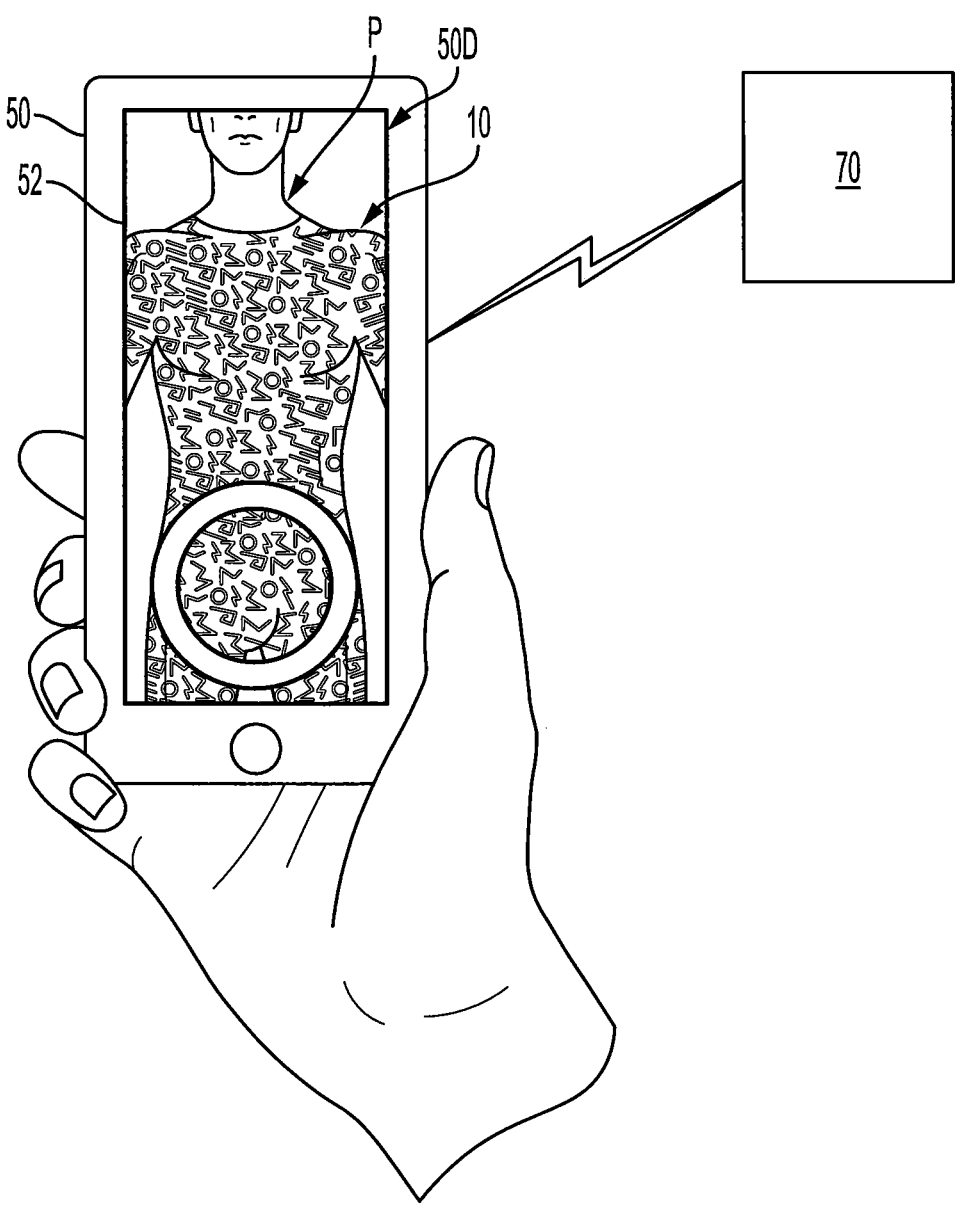

Referring to FIGS. 5A-5C, another person holding a handheld image capture device 50, such as a smartphone, places the person wearing the garment 10 within the field of view 52 of the camera of the image capture device 50 (FIG. 5A). The image capture device 50 has a display 50D and contains an application or "app" (54, FIG. 10) which provides instructions on taking a 360 degree video/photo sequence of the person P wearing the garment 10. Starting from the front of the person to be measured, the person holding the image capture device 50 walks completely around the person P, indicated by arrow A in FIG. 5B, thereby obtaining a full 360 degree video/photo sequence of the garment 10 and reference target 20. The person P wearing the garment 10 is instructed to remain stationary as the camera obtains the video. Images are taken at successive positions around the person (e.g., about 24-30 positions, although other numbers of positions may be utilized) wearing the garment 10.

The person holding the image capture device 50 need not walk in a precise circle around the person P wearing the garment 10. The path may be arbitrary in configuration in some embodiments.

When the person holding the image capture device 50 has completed the 360 degree circuit around the person wearing the garment 10, the image capture device 50 is moved in closer and the field of view 52 is centered from only thigh to shoulder height, as illustrated in FIG. 5C before the video acquisition is stopped. This freehand movement of an image capture device 50 around the person is a vast improvement to the field of body measurement since no fixed cameras, tripods or calibrated arrangements for lighting and cameras are required.

To facilitate stabilization of a person P and to provide pose control for arm spacing during image acquisition, various portable stabilization devices may be utilized. For example, as illustrated in FIGS. 8A-8E, an elongate, slender rod 300 may be held by the person P. The illustrated rod 300 includes opposite end portions 300a, 300b with a hand gripping member 302 located at each end portion 300a, 300b. The illustrated hand gripping members 302 are spherical in shape and are configured to be gripped by the person P. However, the hand gripping members 302 may have various shapes and configurations and are not limited to the illustrated embodiment. The rod 302 is slender so as not to obscure the person P during image acquisition via an image capture device 50.

Figure 8C:
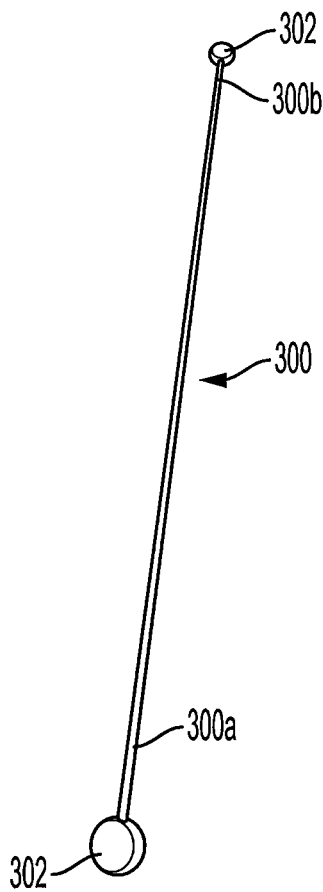
FIG. 8C is a perspective view of a two-piece rod in an assembled configuration, according to some embodiments of the present invention.
Figure 8D:
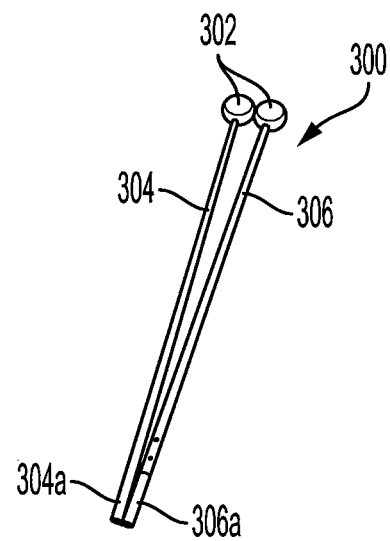
FIG. 8D illustrates the two-piece rod of FIG. 8C in a disassembled configuration.
Figure 8E:
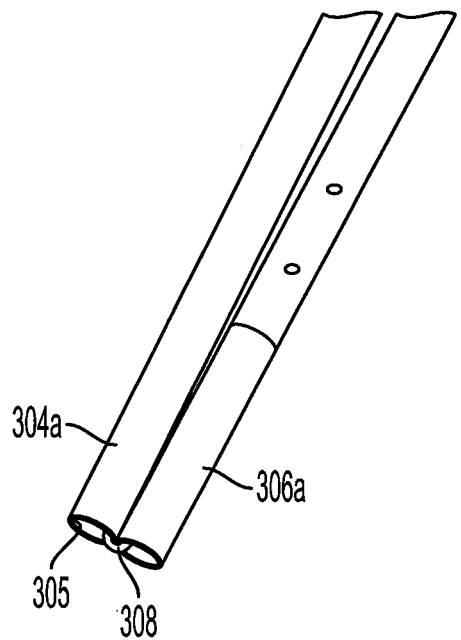
FIG. 8E is an enlarged view of the telescoping ends of the two-piece rod of FIG. 8D.

According to some embodiments, the rod 300 may be "modular" in that it comprises component members that can be assembled and disassembled to facilitate shipment and storage. In the illustrated embodiment of FIGS. 8C-8E, the rod 300 comprises two tubular members 304, 306 that are telescopically connected to each other. For example, and as illustrated in FIG. 8E, tubular member 306 has an end portion 306a that is configured to be removably inserted within the opening 305 of tubular member 304. In the illustrated embodiment of FIG. 8E, the two tubular members 304, 306 are connected by an elastic cord 308 secured within the two tubular members 304, 306. The elastic cord 308 facilitates telescopically connecting the tubular members 304, 306 by urging the end portion 306a into the opening 305 of tubular member 304, as would be understood by one skilled in the art.

Embodiments of the present invention are not limited to stabilizing devices that are only in a rod-shaped configuration. Stabilizing devices may have various shapes and configurations as long as they are slender so as not to obscure a person P holding the device during image acquisition via an image capture device 50.

Figure 9:
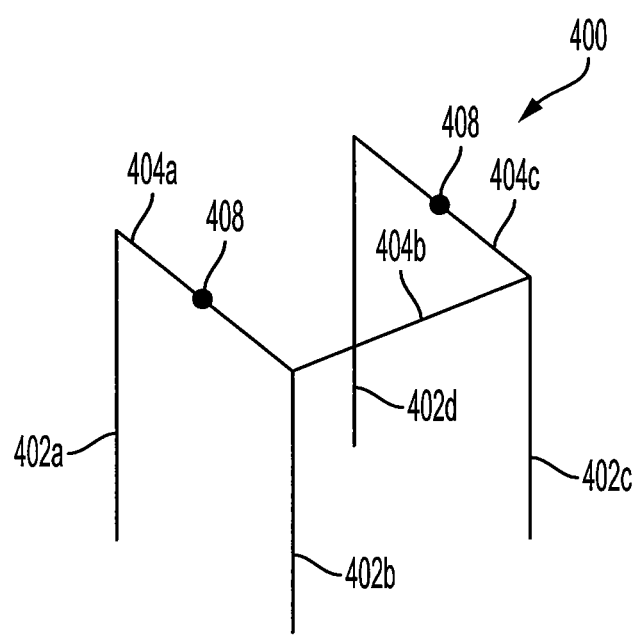
FIG. 9 is a perspective schematic view of a walker-type device that facilitates stabilization of the person and provides pose control for arm spacing, according to some embodiments of the present invention.

For example, in other embodiments, as illustrated in FIG. 9, a stabilizing device may be a "walker style" structure 400 that rests on the ground. The stabilizing device 400 is formed from elongate, slender leg members 402a, 402b, 402c, 402d, and elongate, slender horizontal members 404a, 404b, 404c. Horizontal member 404a extends between and connects to leg members 402a and 402b; horizontal member 404b extends between and connects to leg members 402b and 402c; and horizontal member 404c extends between and connects to leg members 402c and 402d. Horizontal members 404a and 404c each have a hand gripping portion 408 that is configured to be gripped by a person P during image acquisition. The spacing of the hand gripping portions 408 also provides arm spacing pose control.

The various members 402a-402d and 404a-404c of the stabilizing device 400 may be removably secured to each other and may also be formed of multiple components that can be assembled and disassembled to facilitate shipment and storage.

Figure 10:
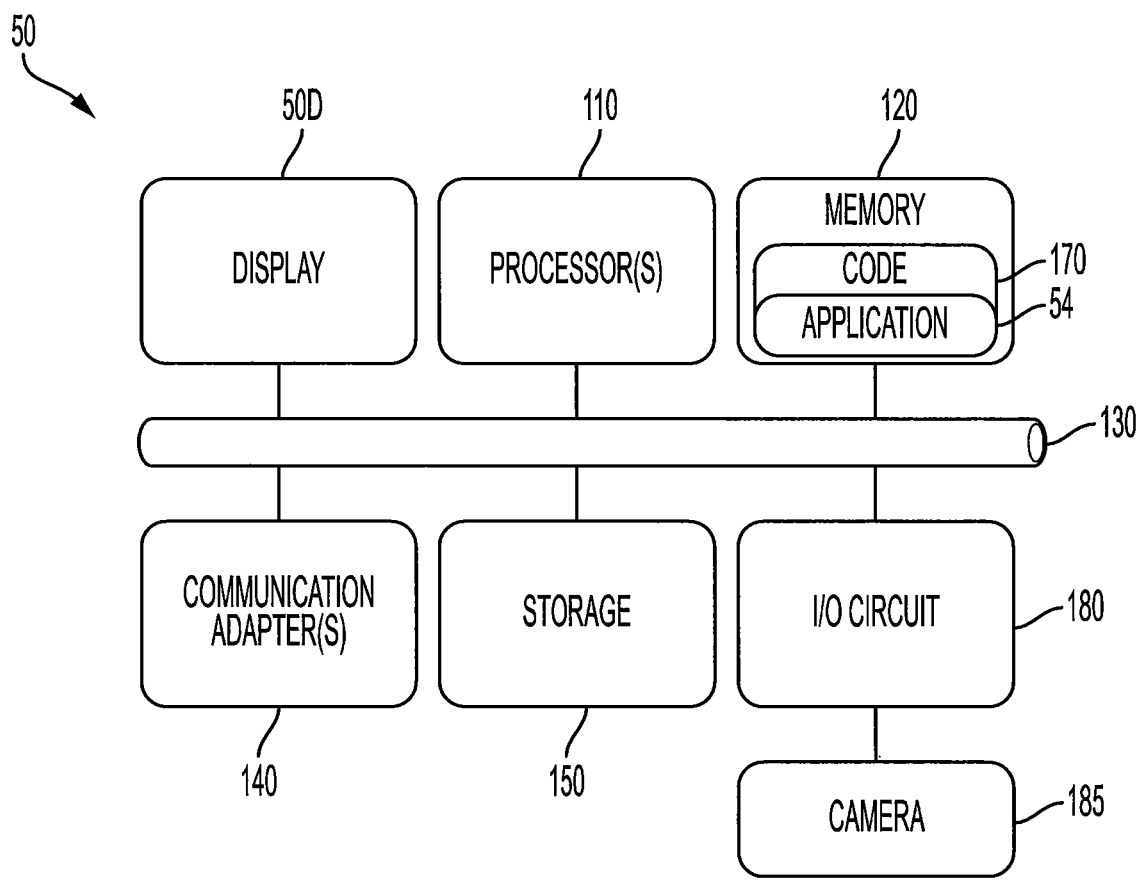
FIG. 10 is a block diagram of an image capture device configured to capture images of a person in a 360° sequence, according to some embodiments of the present invention.

As shown in FIG. 10, the image capture device 50 may include one or more processors 110 and memory 120 coupled to an interconnect 130. The interconnect 130 may be an abstraction that represents any one or more separate physical buses, point to point connections, or both connected by appropriate bridges, adapters, or controllers. The interconnect 130, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire."

The processor(s) 110 may be, or may include, one or more programmable general purpose or special-purpose microprocessors, digital signal processors (DSPs), programmable controllers, application specific integrated circuits (ASICs), programmable logic devices (PLDs), field-programmable gate arrays (FPGAs), trusted platform modules (TPMs), or a combination of such or similar devices, which may be collocated or distributed across one or more data networks. The processor(s) 110 may be configured to execute computer program instructions from the memory 120 to perform some or all of the operations for one or more of the embodiments disclosed herein.

The image capture device 50 may also include one or more communication adapters 140 that may communicate with other communication devices and/or one or more networks, including any conventional, public and/or private, real and/or virtual, wired and/or wireless network, including, for example, Bluetooth, Zigbee, and/or the Internet. The communication adapters 140 may include a communication interface and may be used to transfer information in the form of signals between the image capture device 50 and another computer system or a network (e.g., the Internet). The communication adapters 140 may include a modem, a network interface (such as an Ethernet card), a wireless interface, a radio interface, a communications port, a PCM-CIA slot and card, or the like. These components may be conventional components, such as those used in many conventional computing devices, and their functionality, with respect to conventional operations, is generally known to those skilled in the art. In some embodiments, the communication adapters 140 may be used to transmit and/or receive data associated with the embodiments for creating the 3D model described herein.

The image capture device 50 may further include memory 120 which may contain program code 170 configured to execute operations associated with the embodiments described herein. Part of the program code 170 may include the app 54 discussed herein. The memory 120 may include removable and/or fixed non-volatile memory devices (such as but not limited to a hard disk drive, flash memory, and/or like devices that may store computer program instructions and data on computer-readable media), volatile memory devices (such as but not limited to random access memory), as well as virtual storage (such as but not limited to a RAM disk). The memory 120 may also include systems and/or devices used for storage of the image capture device 50.

The image capture device 50 includes a digital camera 185, and may include one or more input device(s) such as, but not limited to, a mouse, keyboard, a positioning device (e.g., a GPS or other location positioning device), and/or a microphone connected to an input/output circuit 180. The input device(s) may be accessible to the one or more processors 110 via the system interconnect 130 and may be operated by the program code 170 resident in the memory 120. The camera 185 is used to acquire images for the generation of the 3D model, as discussed herein.

The image capture device 50 also includes a display 50D configured to generate a display image, graphical user interface, and visual alert. The display 50D is accessible to the processor(s) 110 via the system interconnect 130 and provides graphical user interfaces for receiving input, displaying intermediate operations/data, displaying notifications, and/or exporting output of the methods described herein.

The image capture device 50 may also include a storage repository 150. The storage repository 150 may be accessible to the processor(s) 110 via the system interconnect 130 and may additionally store information associated with the image capture device 50. For example, in some embodiments, the storage repository 150 may contain position information, timestamps, unique information identification numbers, and/or captured images during a 360° video/photo sequence as described herein. Though illustrated as separate elements, it will be understood that the storage repository 150 and the memory 120 may be collocated. That is to say that the memory 120 may be formed from part of the storage repository 150.

The app 54 of the image capture device 50 is configured to remove a majority of or all of the background in the acquired video images, which reduces the size of the acquired images. The app 54 may perform this by removing everything in the captured images not having one of the colors on the garment 10 and the reference target 20. As such, the remaining images include only the garment 10 and the reference target 20. The face of the person P may also be removed from the captured images via the app 54 to provide anonymity, if so desired. The images may be further compressed via a compression algorithm of or associated with the app 54 to reduce the file sizes (e.g., in some embodiments from over 100 megabytes to less than 10 megabytes). This reduction in file size reduces the time to compute the photogrammetry solution by an order of magnitude, e.g., from several minutes to about 15 seconds. In other embodiments, the app 54 is also a photogrammetric processing app configured to convert the images into a 3D model, such as 400 in FIGS. 7A-7B. In other embodiments, partial processing may be performed on the image capture device 50 via the app 54 and partial processing may be performed on the server 70.

Figure 6:
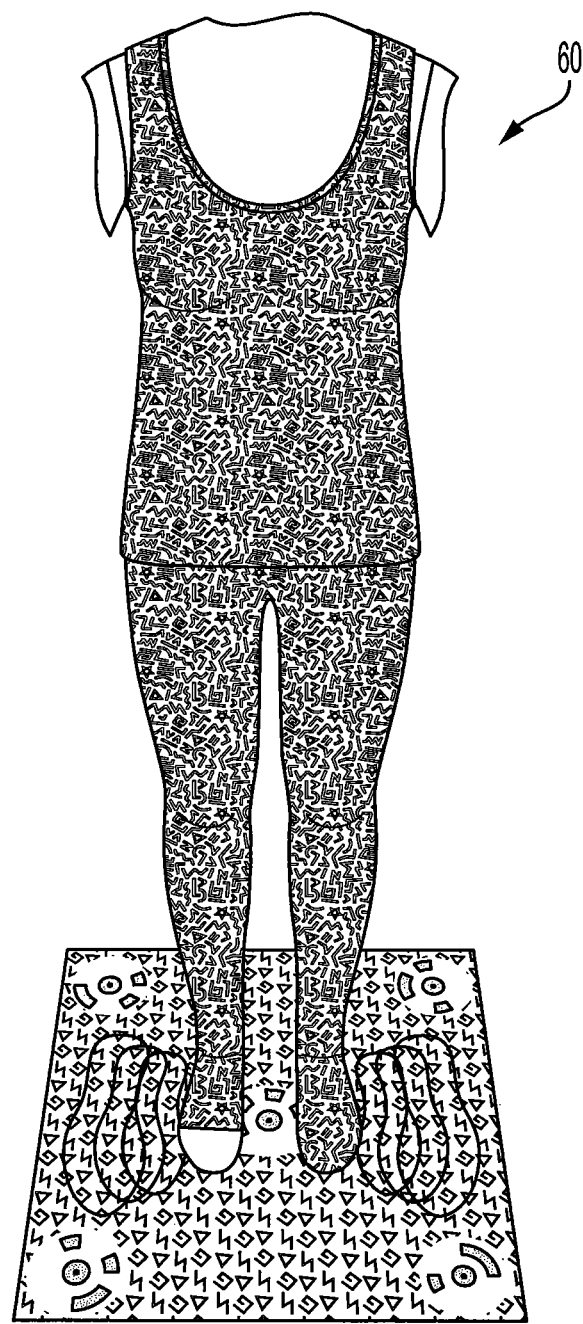
FIG. 6 illustrates a processed image of the mannequin illustrated in FIG. 1 with background removed therefrom according to some embodiments of the present invention.

FIG. 6 illustrates a processed image 60 of the mannequin illustrated in FIG. 1 with the background and face of the person P removed therefrom. The reduced size video images are then uploaded to a server 70 (FIG. 5C) containing photogrammetric processing software, which automatically converts the images into a 3D model, for example 400, FIGS. 7A-7B. The images may be uploaded via a network connection, including any conventional, public and/or private, real and/or virtual, wired and/or wireless network, including, for example, Bluetooth, Zigbee, and/or the Internet.

The server 70 may be at a remote location or may be a cloud computing service or an aggregation of multiple cloud resources. The 3D model is accurately scaled using the reference target fiducial markers 26 and placed in a known coordinate system. The 3D body model is then used to extract body measurements for the person P using, for example, Size Stream 3D Body measurement software, available from Size Stream, LLC, Cary, N.C.

Figure 11:
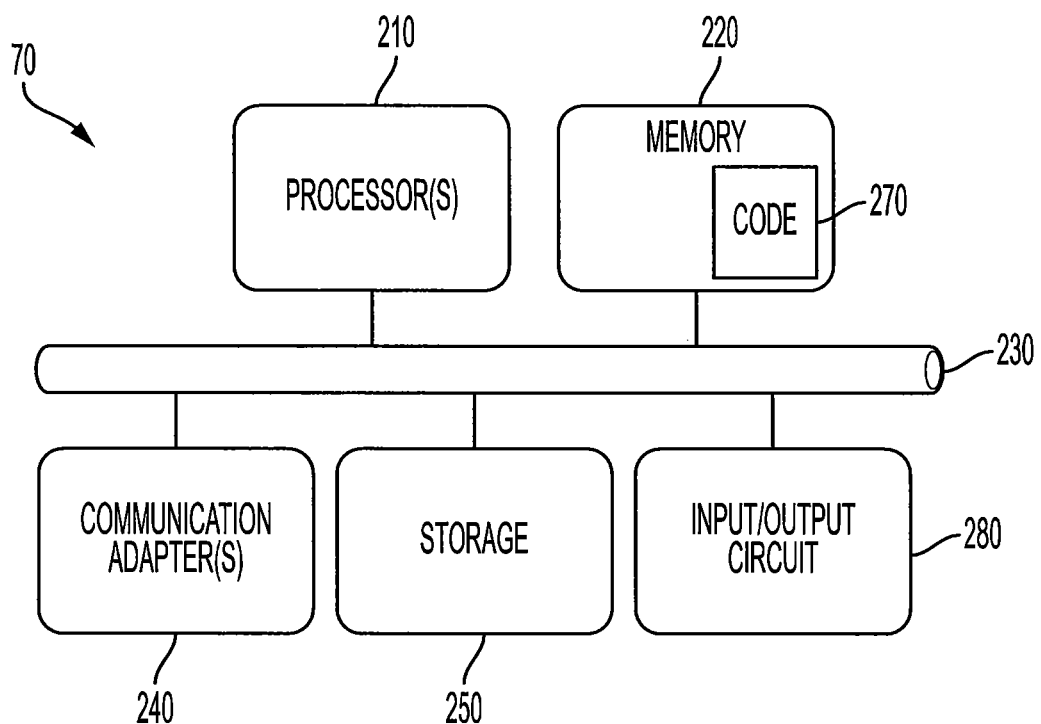
FIG. 11 is a block diagram of an external server configured to process images using photogrammetric processing software, according to some embodiments of the present invention.

FIG. 11 is a block diagram of an external server 70 configured to process images using photogrammetric processing software to produce a 3D model, and/or extract body measurements for a person P from the 3D model, according to some embodiments of the present invention. The external server 70 may use hardware, software implemented with hardware, firmware, tangible computer-readable storage media having instructions stored thereon, and/or a combination thereof, and may be implemented in one or more computer systems or other processing systems. The external server 70 may also utilize a virtual instance of a computer. As such, the devices and methods described herein may be embodied in any combination of hardware and software. In some embodiments, the external server 70 may be in communication with the image capture device 50 illustrated in FIG. 5C.

As shown in FIG. 11, the external server 70 may include one or more processors 210 and memory 220 coupled to an interconnect 230. The interconnect 230 may be an abstraction that represents any one or more separate physical buses, point to point connections, or both connected by appropriate bridges, adapters, or controllers. The interconnect 230, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire."

The processor(s) 210 may be, or may include, one or more programmable general purpose or special-purpose microprocessors, digital signal processors (DSPs), programmable controllers, application specific integrated circuits (ASICs), programmable logic devices (PLDs), field-programmable gate arrays (FPGAs), trusted platform modules (TPMs), or a combination of such or similar devices, which may be collocated or distributed across one or more data networks. The processor(s) 210 may be configured to execute computer program instructions from the memory 220 to perform one or more photogrammetric methods of processing images to produce 3D models of a body of a person.

The external server 70 may also include one or more communication adapters 240 that may communicate with other communication devices and/or one or more networks, including any conventional, public and/or private, real and/or virtual, wired and/or wireless network, including, for example, Bluetooth, Zigbee, and/or the Internet. The communication adapters 240 may include a communication interface and may be used to transfer information in the form of signals between the external server 70 and another computer system or a network (e.g., the Internet). The communication adapters 240 may include a modem, a network interface (such as an Ethernet card), a wireless interface, a radio interface, a communications port, a PCM-CIA slot and card, or the like. These components may be conventional components, such as those used in many conventional computing devices, and their functionality, with respect to conventional operations, is generally known to those skilled in the art. In some embodiments, the communication adapters 240 may be used to transmit and/or receive data (e.g., from an image capture device 50) associated with the embodiments for creating a 3D model described herein.

The external server 70 may further include memory 220 which may contain program code 270 configured to execute operations associated with the embodiments of the external server 70 described herein. For example, the program code 270 is configured to communicate with an image capture device 50 and receive images taken by the image capture device 50 during a 360° video/photo sequence around a person P, as described above. The program code 270 is also configured to generate a 3D model (e.g., 400, FIGS. 7A-7B) from the images received from the image capture device 50 and/or may be configured to transmit the images to an additional server to generate the 3D model. The program code 270 may also be configured to extract body measurements (e.g., the body measurements 502 displayed within user interface 500 of FIG. 7C) for a person from the 3D model.

The memory 220 may include removable and/or fixed non-volatile memory devices (such as but not limited to a hard disk drive, flash memory, and/or like devices that may store computer program instructions and data on computer-readable media), volatile memory devices (such as but not limited to random access memory), as well as virtual storage (such as but not limited to a RAM disk). The memory 220 may also include systems and/or devices used for storage of the external server 70.

The external server 70 may also include one or more input device(s) such as, but not limited to, a mouse, keyboard, camera, and/or a microphone connected to an input/output circuit 280. The input device(s) may be accessible to the one or more processors 210 via the system interconnect 230 and may be operated by the program code 270 resident in the memory 220.

The external server 70 may also include a storage repository 250. The storage repository 250 may be accessible to the processor(s) 210 via the system interconnect 230 and may additionally store information associated with the external server 70. For example, in some embodiments, the storage repository 250 may contain images, unique identification numbers, 360° sequence locations, program code for extracting body measurements from 3D models, etc., as described herein. Though illustrated as separate elements, it will be understood that the storage repository 250 and the memory 220 may be collocated. That is to say that the memory 220 may be formed from part of the storage repository 250.

Figure 7A:
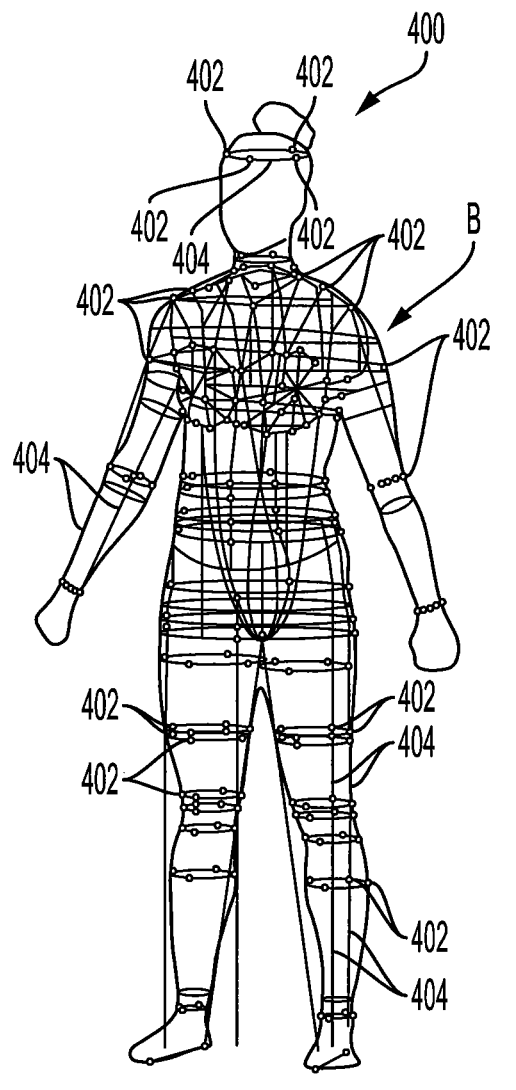
FIGS. 7A-7B illustrate 3D models of a body of a person, and from which body measurements can be obtained in accordance with embodiments of the present invention.
Figure 7B:
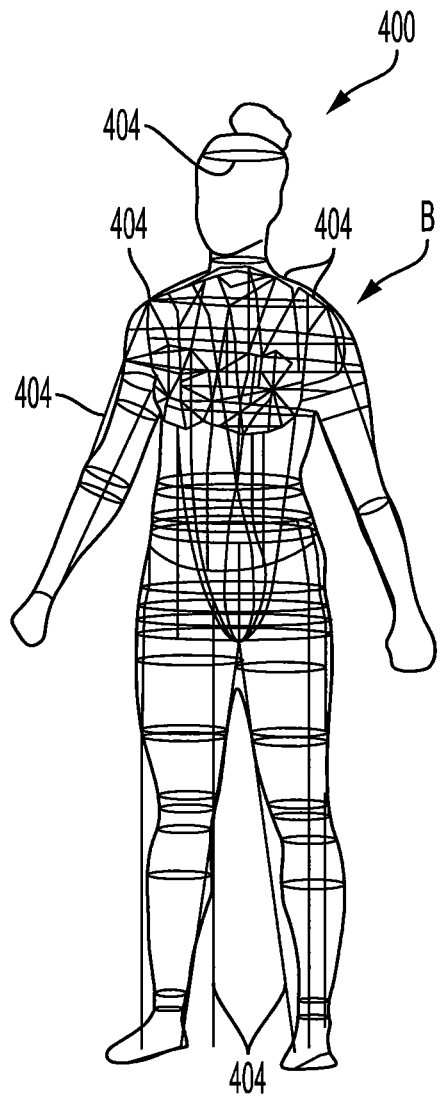

FIGS. 7A-7B illustrate different renderings of a 3D model 400 of a body of a person, and from which body measurements can be obtained in accordance with embodiments of the present invention. The 3D model in FIG. 7A illustrates landmark points 402 and measurement lines 404 for the body B of the person. FIG. 7A illustrates the body B as transparent for ease of illustration of the landmark points 402 and measurement lines 404. FIG. 7B illustrates the surface of the body B so that it can be clearly seen as a person.

FIG. 7C is an exemplary graphical user interface 500 displaying a listing of body measurements 502 obtained from a 3D body model acquired in accordance with embodiments of the present invention, such as the 3D models 400 of FIGS. 7A-7B. The body measurements displayed in user interface 500 correspond to the measurement lines 404 and landmark points 402 in the 3D models 400 illustrated in FIGS. 7A-7B. The numerical values of these body measurements can be utilized for any application, e.g., custom clothes, tracking a body shape, etc.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the teachings and advantages of this invention. Accordingly, all such modifications are intended to be included within the scope of this invention as defined in the claims. The invention is defined by the following claims, with equivalents of the claims to be included therein.

That which is claimed is:

1. A method of obtaining body measurements of a person, the method comprising:
   enclosing a portion of a body of the person in a form fitting garment, wherein a surface of the form fitting garment includes a plurality of first fiducials that are photogrammetrically analyzable, wherein the portion of the body includes one or more limbs of the body and/or a torso of the body;
   having the person stand near a reference target, wherein the reference target includes a plurality of reference markers that are recognizable by image processing software, and a plurality of second fiducials that are photogrammetrically analyzable;
   moving a digital camera around the person and acquiring a plurality of images of the at least one garment and reference target, wherein at least one image is acquired at successive positions of the digital camera as it is moved around the person; and
   processing the plurality images by one or more photogrammetry methods to produce a 3D model of the portion of the body.

2. The method of claim 1, further comprising enclosing an additional portion of the body of the person with a second form fitting garment, wherein a surface of the second garment includes a plurality of the first fiducials.

3. The method of claim 1, further comprising enclosing an additional portion of the body of the person with an accessory, wherein a surface of the accessory includes a plurality of the first fiducials, and wherein the accessory comprises a hat, a head band, at least one glove, or at least one sock.

4. The method of claim 1, wherein the surface of the garment has a first color and the plurality of first fiducials have a second color different from the first color.

5. The method of claim 1, where the plurality of second fiducials on the reference target are of known proportion and facilitate producing the 3D model true to scale and in a recognized orientation to a surface on which the reference target is positioned.

6. The method of claim 1, further comprising removing background from the plurality of images prior to the processing step.

7. The method of claim 6, wherein removing background from the plurality of images comprises removing portions of the images not having the first and second colors.

8. The method of claim 1, wherein the camera is moved around the body in a substantially circular path or in an arbitrary path.

9. The method of claim 1, wherein the plurality of second fiducials are different from the plurality of first fiducials or are identical to the plurality of first fiducials.

10. An arrangement for obtaining body measurements of a body of a person, the arrangement comprising:
    a garment configured to be form fitted to the body, wherein a surface of the garment comprises a plurality of first fiducials which are photogrammetrically analyzable, wherein the surface of the garment has a first color and wherein the plurality of first fiducials have a second color different from the first color;
    a reference target to be positioned near the person, wherein the reference target comprises a plurality of reference markers that are recognizable by image processing software, and a plurality of second fiducials that are photogrammetrically analyzable, wherein the plurality of second fiducials on the reference target are of known proportion and facilitate producing a 3D model of the body true to scale and in a recognized orientation to a surface on which the person is standing; and
    a handheld device comprising a digital camera, wherein the digital camera is configured to acquire a plurality of successive images of the garment and reference target as the device is moved around the person, wherein a processor associated with the handheld device is configured to remove background from the plurality of images by removing portions of the images not having the first and second colors.

11. The arrangement of claim 10, wherein the handheld device is configured to process the plurality images by one or more photogrammetry methods to produce a 3D model of the body.

12. The arrangement of claim 10, further comprising a remotely located processor to which the acquired images are transmitted and which is configured to process the plurality images by one or more photogrammetry methods to produce a 3D model of the body.

13. The arrangement of claim 10, wherein the handheld device is configured to at least partially process the plurality images by one or more photogrammetry methods to produce a 3D model of the body, and wherein the arrangement further comprises a remotely located processor to which the acquired images are transmitted from the handheld device and which is configured to at least partially process the plurality images by one or more photogrammetry methods to produce a 3D model of the body.

14. The arrangement of claim 10, wherein the plurality of second fiducials are different from the plurality of first fiducials.

15. The arrangement of claim 10, further comprising a portable stabilization device configured to be held by the person, wherein the stabilization device is configured to reduce movement of the person and to control arm spacing during image acquisition.

16. The arrangement of claim 15, wherein the stabilization device comprises an elongated rod or a walker-style device.

17. An arrangement for obtaining body measurements of a body of a person, the arrangement comprising:
    a garment configured to be form fitted to the body, wherein a surface of the at least one garment comprises a plurality of first fiducials which are photogrammetrically analyzable; and
    a reference target to be positioned near the person, wherein the reference target comprises a plurality of reference markers that are recognizable by image processing software, and a plurality of second fiducials in a remaining area of the reference target, wherein the plurality of second fiducials are photogrammetrically analyzable.

18. The arrangement of claim 17, wherein the surface of the garment has a first color and wherein the plurality of first fiducials have a second color different from the first color.

19. The arrangement of claim 17, wherein the plurality of second fiducials are different from the plurality of first fiducials.

20. The arrangement of claim 17, wherein the plurality of second fiducials are identical to the plurality of first fiducials.

21. The arrangement of claim 17, wherein reference target has a ring configuration with an inner open region within which the person stands.

22. The arrangement of claim 17, wherein reference target further comprises markings that indicate where the person should place their feet on the reference target.

* * * * *